(12) United States Patent
Shimizu (10) Patent No.: US 7,881,272 B2
(45) Date of Patent: Feb. 1, 2011

(54) INFORMATION COMMUNICATIONS SYSTEM, INFORMATION PROCESSING UNIT, AND INFORMATION COMMUNICATION METHOD

(75) Inventor: Takanori Shimizu, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 710 days.

(21) Appl. No.: 11/937,620

(22) Filed: Nov. 9, 2007

(65) Prior Publication Data

US 2008/0114912 A1 May 15, 2008

(30) Foreign Application Priority Data

Nov. 9, 2006 (JP) ............................... 2006-304218

(51) Int. Cl.
*H04W 4/00* (2009.01)
(52) U.S. Cl. ...................................... 370/338; 710/106
(58) Field of Classification Search .................. 370/338, 370/328, 310.2, 312, 219, 220, 315, 363, 370/365, 329, 318, 389, 397, 399, 400, 401, 370/471, 305, 395.3, 395.71; 710/106
See application file for complete search history.

(56) References Cited

U.S. PATENT DOCUMENTS 6,594,727 B1 * 7/2003 Tanaka ........................ 711/115

7,453,859 B2 * 11/2008 Fujii et al. .................. 370/338

FOREIGN PATENT DOCUMENTS

JP 2002-202843 7/2002

* cited by examiner

*Primary Examiner*—Chi H Pham
*Assistant Examiner*—Alexander Boakye
(74) *Attorney, Agent, or Firm*—Katten Muchin Rosenman LLP (57) ABSTRACT

This invention suppresses increase in power consumption and reduces the time it takes until a controller is usable when starting the operation of console main unit from the standby state by the controller through BT communication. When a console main unit 10 is started up from the standby state by a controller through BT communication, a main CPU 64 of the console main unit 10 reads in and runs a controller connection managing program after the BT driver is read-in and run. Upon reception of a logical layer connection request signal from the controller, the main CPU 64 stores that logical layer connection request signal in main memory 65, reads in and runs the controller connection managing program, reads in terminal identification information from the main memory 65, establishes a logical layer connection through BT communication, and makes a communication module 79 transmit a logical layer connection enable signal.

7 Claims, 7 Drawing Sheets

INFORMATION COMMUNICATIONS SYSTEM, INFORMATION PROCESSING UNIT, AND INFORMATION COMMUNICATION METHOD

BACKGROUND OF THE INVENTION

The present invention relates to an information communications system constituted by an operation terminal and an information processing unit such as an entertainment system, which includes a video game console and a controller, an information processing unit such as a video game console, and an information communication method for communication between the video game console and the controller.

With a system where the controller and the information processing unit are wirelessly connected, a user may make the information processing unit conduct desired processing through remote-control operation using the controller.

[Patent Document 1] Japanese Patent No. 3581118

SUMMARY OF THE INVENTION

An information processing system of the present invention includes an operation terminal operated by a user and an information processing unit settable in a standby state.

The operation terminal has a terminal side wireless transmitter, an input unit and a signal generator.

The terminal side wireless transmitter transmits and receives information to/from the information processing unit through wireless communication. The input unit accepts a start-up instruction from the user for starting up the information processing unit in the standby state. When the input unit received the start-up instruction, the signal generator generates a physical layer connection request signal and makes the terminal side wireless transmitter transmit the physical layer connection request signal. When the terminal side wireless transmitter received a physical layer connection enable signal from the information processing unit, the signal generator generates a logical layer connection request signal including terminal identification information uniquely set to the operation terminal and makes the terminal side wireless transmitter transmit the logical layer connection request signal repeatedly until the terminal side wireless transmitter receives a logical layer connection enable signal from the information processing unit.

The information processing unit has a console side wireless transmitter, a start-up processing unit, a storage, a storage controller, a wireless logical layer connection processing unit and an information processing conducting unit.

The console side wireless transmitter conducts a physical layer connection process when the console side wireless transmitter received the physical layer connection request signal from the operation terminal. The physical layer connection process includes establishing a physical layer connection with the operation terminal through wireless communication and transmitting the physical layer connection enable signal to the operation terminal. The console side wireless transmitter transmits and receives information to/from the operation terminal through wireless communication in a state where the physical layer connection is established. When the information processing unit is in the standby state and the console side wireless transmitter received the physical layer connection request signal from the operation terminal, the start-up processing unit starts a start-up process for the information processing unit. The storage controller stores in the storage at least the terminal identification information included in the logical layer connection request signal when the console side wireless transmitter received the logical layer connection request signal from the operation terminal. The wireless logical layer connection processing unit conducts a logical layer connection process. The logical layer connection process includes reading out the terminal identification information from the storage, establishing a logical layer connection with the operation terminal through wireless communication, generating the logical layer connection enable signal, and transmitting the logical layer connection enable signal from the console side wireless transmitter. The information processing conducting unit conducts predetermined information processing according to information that the console side wireless transmitter has received from the operation terminal in a state where the logical layer connection is established.

In the standby state, the storage controller, the wireless logical layer connection processing unit, and the information processing conducting unit of the information processing unit are halted, and the console side wireless transmitter and the start-up processing unit are started up. In the start-up process, the storage controller starts up earlier than the wireless logical layer connection processing unit.

According to the present invention, the time it takes until the information processing unit is allowed to conduct a desired processing in conformity with remote-control operation using a controller may be reduced when starting up the information processing unit from the standby state through wireless remote-control operation using the controller.

DESCRIPTION OF REFERENCE NUMERALS

10: entertainment console (console main unit); 20: controller; 54: south bridge (SB); 64: main CPU; 65: main memory; 73: system controller; 78: USB communication module; 79: BT communication module; 81: CPU; 88: USB communication module; 89: BT communication module

DETAILED DESCRIPTION OF THE PREFERRED EMBODIMENTS

There are electrical household appliances such as televisions settable to be in an on state (complete running state), an off state (complete shutdown state), or a standby state (suspended state/sleep state).

In addition, there are electrical household appliances settable to be in the standby state, which may be started up through remote-control operation using a controller.

However, in the case of the information processing unit, a user cannot make the information processing unit conduct desired processing through remote-control operation using the controller until processing for setting correspondence to the controller (logical layer connection process) is completed, which is different than with the electrical household appliances.

More specifically, the controller transmits a physical layer connection request signal (start-up request signal) to the information processing unit in accordance with a predetermined manipulation by the user. The information processing unit in the standby state, which has received the physical layer connection request signal, conducts a start-up process and transmits a physical layer connection enable signal to the controller. The controller, which has received the physical layer connection enable signal, then transmits a logical layer connection request signal to the information processing unit. The information processing unit, which has received the logical layer connection request signal, conducts the logical layer connection process and transmits a logical layer connection enable signal to the controller. By the controller receiving this logical layer connection enable signal, logical layer connection of the information processing unit and the controller is established, allowing the user to make the information processing unit conduct desired processing through remote-control operation using the controller.

At this time, the information processing unit that has transmitted the physical layer connection enable signal nullifies the received logical layer connection request signal until the logical layer connection process is executable, and the controller repeatedly transmits the logical layer connection request signal at predetermined intervals until a logical layer connection enable signal is received from the information processing unit. As a result, depending on the timing when the information processing unit is in a state capable of conducting the logical layer connection process, period until the logical layer connection request signal is received from the controller is longer, a long time passes until the logical layer connection process is conducted by the information processing unit (until a logical layer connection is established), and a long time might pass until desired processing is conducted by the information processing unit through remote-control operation using the controller.

While such inconveniences are avoidable by changing the standby state of the information processing unit to a logical layer connection process allowable state, this leads to an increase in power consumption of the information processing unit in the standby state.

The present invention is devised through consideration of the aforementioned problems. An objective thereof is to suppress increase in power consumption and reduce the time it takes until a desired processing by the information processing unit through remote-control operation using a controller can be conducted when starting the operation of the information processing unit from the standby state by remote-control operation using the controller through wireless communication.

General Structure of the Embodiment

Figure 1:
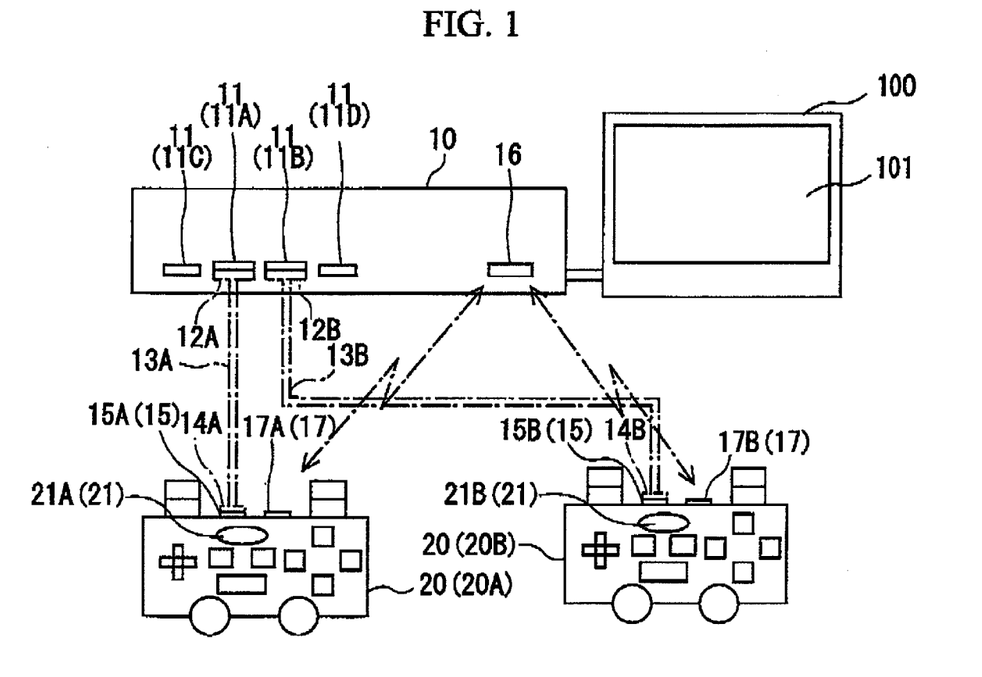
FIG. 1 is a diagram schematically showing an entertainment system of an embodiment of the present invention.

An entertainment system according to an embodiment of the present invention shown in FIG. 1 includes an entertainment console (hereafter referred to as console main unit) 10, which is an exemplary video game console of an information processing unit according to the present invention, and controllers 20 (two controllers 20A and 20B in the example of FIG. 1), which are multiple operation terminals operated by users (players). Information is transmitted and received through communication between the console main unit 10 and the respective controllers 20A and 20B. The players may arbitrarily select either communication therebetween by a wired connection via USB cables 13A and 13B or by a wireless connection. Furthermore, when a wired connection is established between the console main unit 10 and the respective controllers 20, wired communication is conducted with priority except for a start-up process described later, and wireless communication is not conducted.

In the example of FIG. 1, the console main unit 10 has multiple controller ports 11 (four ports 11A, 11B, 11C, and 11D in this embodiment). For wirelessly connecting the respective controllers 20A and 20B and the console main unit 10, the USB cable 13A has a plug-in connector 12A provided on an end inserted into an arbitrary one of the controller ports 11 (11A in this example) of the console main unit 10 and electrically connected, and a plug-in connector 14A provided on the other end is inserted into a connection port 15 (15A) of the controller 20A and electrically connected. Furthermore, the USB cable 13B has a plug-in connector 12B provided on an end inserted into an arbitrary one (11B) of the controller ports 11 of the console main unit 10 and electrically connected, and a plug-in connector 143 provided on the other end is inserted into a connection port 15 (15B) of the controller 20B and electrically connected. The wired connection method used between the console main unit 10 and the controllers 20 should allow two-way communications, and a universal serial bus (USB) connection is adopted in this embodiment.

Furthermore, the respective controllers 20 (20A and 20B) are provided with respective communication units (antennas) 17 (17A and 17B) for transmitting and receiving information through wireless communication between the console maim unit 10 and wireless communication units (antennas) 16. There are various communication methods applicable between the wireless communication units 16 and 17 such as a general purpose short-range, high-speed wireless communication method such as Bluetooth™ or an exclusive short-range, wireless communication method as long as two-way wireless communication is possible therebetween. Bluetooth™ wireless communication (hereafter referred to as BT communication) is adopted in this embodiment.

[Overall Structure of Entertainment System]

The entertainment system shown in FIG. 1 is constituted by the console main unit 10, the controllers 20 (20A and 20B), and a monitor device (e.g., television receiver) 100 to which images and audio signals are supplied from the console main unit 10. The monitor device 100 has an image display unit 101 for displaying the images based on the audio signals supplied from the console main unit 10.

[Exterior of Console Main Unit]

In addition to the above-mentioned controller ports 11 (11A to 11D) and the wireless communication units 16, the console main unit 10 is provided with a memory card slot in which a memory card may be inserted/ejected, a disk tray, an open/close button for opening and closing the disk tray, an on/standby/reset button for turning power on, entering standby mode, or resetting, an audio-video output terminal (AV multi-output terminal), a PC card slot, an optical digital output terminal, an IEEE (Institute of Electrical and Electronics Engineers) 1394 connection terminal, a power switch, and an AC power input terminal not shown in the drawing.

The console main unit 10 is switched from an on state (complete running state) to an off state (complete shutdown state) by operating a power switch. Furthermore, the console main unit 10 in the on state is switched from the on state to a standby state (suspended state, sleep state) by operating the on/standby/reset button. Note that switching between the on state and the standby state of the console main unit 10 is also possible through remote-control operation using the controllers 20. For example, when the console main unit 10 is in the on state, the console main unit 10 is switched to the standby state by manipulating the controller 20 to display a menu screen on the monitor device 100, and select and determine 'Turn off power of main unit' in a menu. When the console main unit 10 is in the standby state, the console main unit 10 starts up and switches to the on state by pressing a start button 53 (shown in FIG. 2) described later of the controller 20.

The console main unit 10 is capable of executing a video game based on an application program for the video game recorded on a disk medium such as a DVD-ROM or CD-ROM, for example, and reproducing (decoding) video data and audio data recorded on a DVD or CD.

Note that the above-mentioned application program and video/audio data are read from not only disk media but also from semiconductor memory and tape media. It may also be supplied from a wired or wireless wide-area or intra-area communication line.

[Exterior of Controller]

Figure 2:
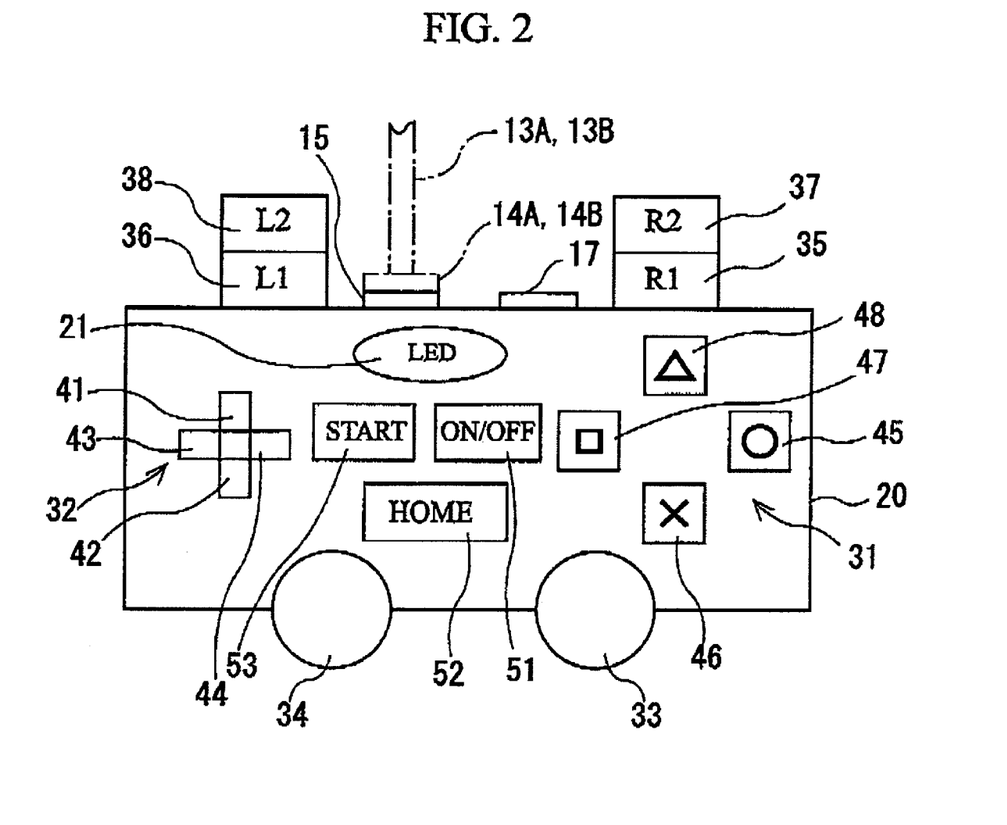
FIG. 2 is a diagram schematically showing an external structure of a controller.

The exterior of the controller 20 is briefly described with reference to FIG. 2.

The controller 20 includes the above-mentioned connection port 15 for USB connection with the console main unit 10, the above-mentioned wireless communication unit 17 for BT communication with the console main unit 10, and the display unit 21.

The controller 20 is provided with a right operation part 31 and a left operation part 32 respectively operable by the player's right and left thumbs when the player is gripping the controller 20 in the right and left hands, a right analog operation part 33 and a left analog operation part 34 respectively capable of analog operation also by the right and left thumbs, a first right push button 35 and a first left push button 36 respectively pushed by the right and left index fingers, and a second right push button 37 and a second left push button 38 respectively pushed by the right and left middle fingers.

The left operation part 32 is provided with an up command button 41, a down command button 42, a left command button 43, and a right command button 44 used when the player makes a manipulation such as moving the game character on the screen, for example. Furthermore, the right operation part 31 is provided with first through fourth operation buttons 45 to 48 to which are assigned different functions according to the game application such as setting or executing a function of a game character, for example.

The above-mentioned analog operation parts 33 and 34 are respectively provided with a right and a left rotational operation part (omitted from the drawing), which can rotate 360 degrees around an operational axis and return to a neutral position by a flexible member when not in operation, and a signal generation part (omitted from the drawing), which generates a signal in conformity with operation of these right and left rotational operation parts.

The above-mentioned analog operation parts 33 and 34 are used by rotating the right and left rotational operation parts for moving the game character, for example, while rotating or while varying speed, and for entering command signals for analog movements such as changing form.

Moreover, the controller 20 has an on/off button 51 for turning on/off the power of the controller 20, a home button 52, and the start button 53.

The home button 52 is to be pressed to start communication with the console main unit 10, and to make the console main unit 10 start processing for displaying a menu screen on an image display unit 101. Displaying the menu screen by the console main unit 10 is performed by priority by interrupting other running application programs. Furthermore, the menu screen is displayed even when the home button is depressed, starting communication between the controller 20 and the console main unit 10.

The start button 53 is assigned for inputting to start up the console main unit 10 from the standby state and switch to the on state. Note that another button other than the start button 53 may be assigned for inputting to start up the console main unit 10 from the standby state and switch to the on state.

The display unit 21 may be a liquid crystal display panel, an organic or inorganic electroluminescence (EL) panel, a segment display, or light-emitting diodes (LEDs) visible to the players.

[Internal Circuit Structure of Console Main Unit]

Figure 3:
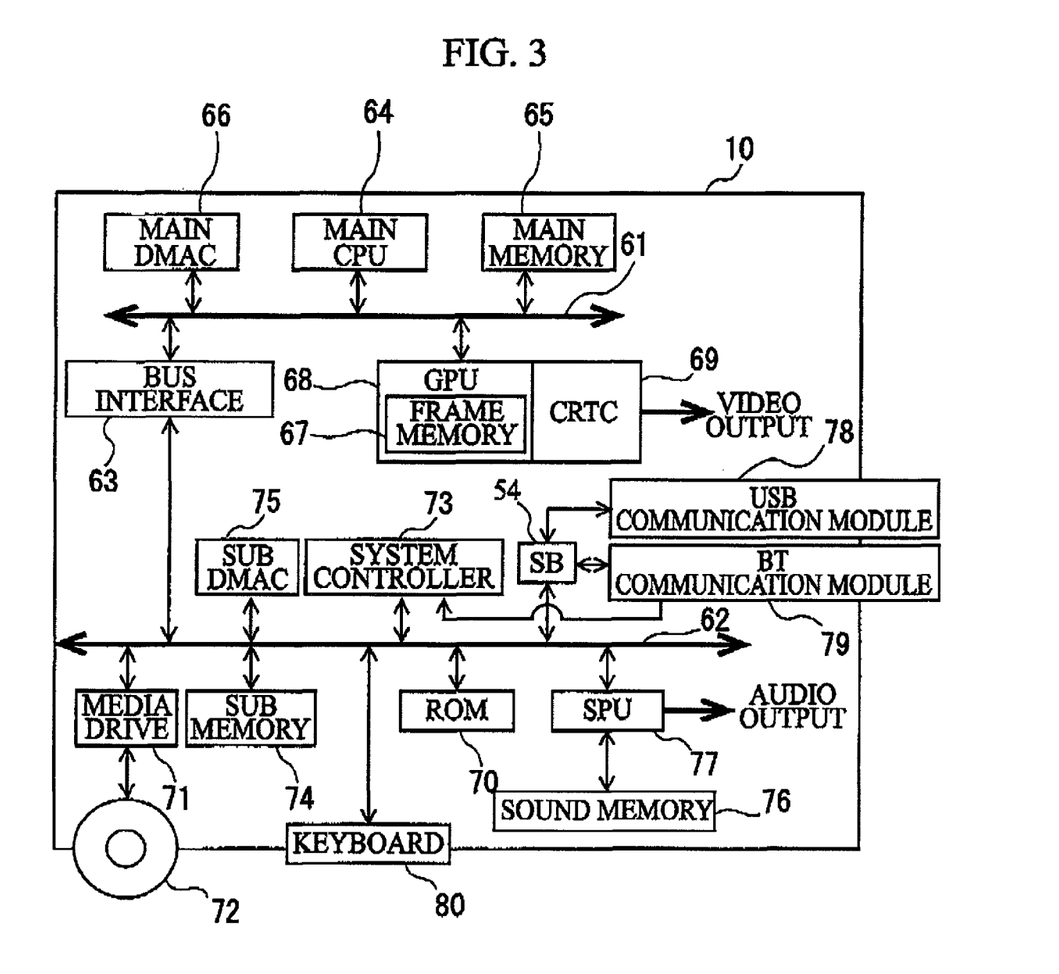
FIG. 3 is a block diagram showing an internal structure of a console main unit.

FIG. 3 shows a main internal structure of the console main unit 10.

As shown in FIG. 3, the console main unit 10 has a main bus 61 and a sub-bus 62, which are either connected or disconnected from each other via a bus interface 63.

A main CPU 64, volatile main memory 65 constituted by DRAM, a main direct memory access controller (DMAC) 66, and a graphic processing unit (GPU) 68 including frame memory 67 are connected to the main bus 61. A CRT controller (CRTC) 69, which is a control means for generating video output signals, is connected to the GPU 68. An image according to video output signals is displayed on a predetermined display unit (the image display unit 101 of the monitor device 100 in this embodiment) connected to the console main unit 10 via a cable or the like.

The main CPU 64 reads a start-up program out from ROM 70 on the sub-bus 62 via the bus interface 63 when starting up the console main unit 10, executes that start-up program to run an operating system, and then reads in various programs such as a BT driver, a USB driver, or a controller connection managing program from the main memory 65 on the main bus 61, and runs those programs. Furthermore, the main CPU 64 controls a media drive 71, reads the application program or data from a medium 72 loaded into the media drive 71, and stores it in the main memory 65. Moreover, geometric processing is carried out for various types of data read out from the medium 72, such as three-dimensional object data (coordinate values of a polygon vertex (representative point)) constituted by multiple basic figures (polygons). A display list including contents of polygon definition information is generated through the geometric processing. Furthermore, data compressed using the moving picture experts group (MPEG) method or the joint photographic experts group (JPEG) method is decompressed. In other words, the main CPU 64 has an information deciphering function for deciphering information using software.

The polygon definition information includes drawing area setting information and polygon information. The drawing area setting information includes offset coordinates relative to the frame buffer address of a drawing area and coordinates in a drawing clipping area for canceling drawing when coordinates of a polygon exist outside of the drawing area. The polygon information includes polygon attribute information and vertex information; wherein the polygon attribute information includes information specifying shading mode, a blending modes texture mapping mode, and the like, and vertex information includes information of coordinates within the vertex drawing area, coordinates within a vertex texture area, and vertex color.

The GPU 68 is stored with drawing contexts, reads out an appropriate drawing context based on image context identification information included in the display list informed from the main CPU 64, renders based thereupon, and draws a polygon in the frame memory 67. The frame memory 67 may also be used as texture memory, and thus a pixel image in the frame memory 67 may be applied to the polygon drawn as texture.

The main DMAC 66 controls DMA transfer for respective circuits connected to the main bus 61, and controls DMA transfer for respective circuits connected to the sub-bus 62 in conformity with status of the bus interface 63.

A USB connection controller ID registration table and a BT connection controller ID registration table for registering unique IDs for the controllers 20 are provided in the main memory 65 in advance. Transmission and reception of information to/from controllers 20 corresponding to the unique IDs registered in the USB connection controller ID registration table is possible through the USB communication, and transmission and reception of information to/from controllers 20 corresponding to the unique IDs registered in the BT connection controller ID registration table is possible through the BT communication. Here, the state (logical layer connection) where transmission and reception of information to/from a controller 20 is possible means a state where, when a player presses the various input buttons 33, 34, 35 to 38, 41 to 48, 51, 52, and 53 of the controller 20, the console main unit 10 is allowed to receive information corresponding to the manipulation from the player and recognize which controller 20 sent the received information, and make the main CPU 64 conduct predetermined processing according to the received information.

A system controller 73 constituted by a microprocessor or the like, a nonvolatile sub-memory 74 constituted by flash memory or the like, a sub-DMAC 75, the ROM 70 stored with programs such as an operating program, a sound processing unit (SPU) 77, which reads out sound data from sound memory 76 and outputs it as audio output, a south bridge (SB) 54 constituted by circuits for managing transfer of data among a USB communication module 78, a ET communication module 79, and other components (e.g., the system controller 73 and the sub-memory 74), a media drive 71 for loading a predetermined medium 72, and a keyboard 80 are connected to the sub-bus 62. The medium 72 is a recording medium such as a CD-ROM or DVD-ROM recorded with an image processing program. The console main unit 10 reads this image processing program to conduct necessary entertainment processing. The USB communication module 78 includes the controller ports 11 (shown in FIG. 1), and transmits and receives information to/from the controllers 20 via the USB cable. The BT communication module 79 includes a wireless transmitter 16 (shown in FIG. 1), and transmits and receives information to/from the controllers 20 via wireless communication.

The system controller 73 carries out various operations including the start-up process described later in accordance with the program stored in the ROM 70. Furthermore, the system controller 73 is directly connected to the BT communication module 79 bypassing the south bridge 54. As a result, when the BT communication module 79 receives a physical layer connection request signal even when the south bridge 54 halts in the standby state, this physical layer connection request signal is transmitted to the system controller 73. The sub-DMAC 75 controls DMA transfer for respective circuits connected to the sub-bus 62 only when the bus interface 63 has disconnected the main bus 61 from the sub-bus 62.

In the standby state, only the system controller 73 and the BT communication module 79 are started up, and the other components such as the main CPU 64 stop running. In this state, the BT communication module 79 is able to receive physical layer connection request signals from the controllers 20. Furthermore, when the console main unit 10 in the standby state receives an instruction to switch over to the on state, the start-up process for starting up the components under suspension such as the system controller 73 begins. In this start-up process, the main CPU 64 reads a start-up program from ROM 70 on the sub-bus 62 via the bus interface 63, executes that start-up program to run an operating system, and then reads in various programs such as a BT driver, a USB driver, or a controller connection managing program from the main memory 65 on the main bus 61, and runs those programs. Programs to be read-in and run by the main CPU 64 at the time of the start-up process are preset, and by running all of those preset programs, the start-up process by the main CPU 64 is complete. Furthermore, in the start-up process, the USB communication module 78 and the south bridge 54 start up earlier than the main CPU 64 starts up. Moreover, the main CPU 64 reads in and runs the BT driver and the USB driver, and then reads in and runs the controller connection managing program.

The BT communication module 79 conducts a physical layer connection process upon reception of a physical layer connection request signal described later from a controller 20. In the physical layer connection process, initialization processing is conducted, a state in which transmission and reception of information (data) through wireless communication to/from the controller 20 is possible is established, and a physical layer connection enable signal is transmitted to the controller 20.

Furthermore, when the BT communication module 79 receives the physical layer connection enable signal from the controller 20, the main CPU 64 conducts a logical layer connection process according to the controller connection managing program. In the logical layer connection process, a state in which transmission and reception of information (data) of the logical layers to/from the controllers 20 is established, and recognition and management of respectively connected controllers 20 is then carried out based on unique IDs for the controllers 20 included in the logical layer connection request signals transmitted from the controllers 20 so that arbitrary and favorable wired or wireless connection to the multiple controllers 20 can be established. Afterwards, a logical layer connection enable signal is transmitted to the respective controllers 20.

The physical layer connection process is complete when the BT communication module 79 conducts the physical layer connection process, and the logical layer connection process is complete when the main CPU 64 conducts the logical layer connection process. Note that the physical layer connection request signal, the physical layer connection enable signal, the logical layer connection request signal, and the logical layer connection enable signal are all packetized.

Since the main CPU 64 halts when the console main unit 10 is in the standby state, the main CPU 64 cannot conduct the logical layer connection process during the start-up process for switching the console main unit 10 from the standby state into the on state and until the main CPU 64 is in a state capable of conducting the logical layer connection process, even if the BT communication module 79 receives a logical layer connection request signal from the controller 20.

Regarding this point, in this embodiment, the BT driver includes a function (program) of storing (queuing) the logical layer connection request signal received by the BT communication module 79 in the main memory 65. Furthermore, the controller connection managing program includes a function (program) of reading out (de-queuing) the logical layer connection request signal from the main memory 65. As a result, the main CPU 64 stores the logical layer connection request signals received by the BT communication module 79 in the main memory 65 as long as read-in processing and other processing by the BT driver are completed, even if the controller connection managing program is not read-in and run yet (even if it is before the main CPU 64 is completely running). In addition, the main CPU 64 reads out the logical layer connection request signal from the main memory 65 and conducts the logical layer connection process after the controller Connection managing program has been read-in and run. Accordingly, the main CPU 64 begins the logical layer connection process without waiting for transmission of a new logical layer connection request signal from the controller 20 when the controller connection managing program has been read-in and run. Note that the information stored in the main memory 65 by the main CPU 64 functioning as the BT driver does not have to be a logical layer connection request signal in itself, and may be information including the controller ID included in a logical layer connection signal. Furthermore, the logical layer connection signal (or information including the controller ID) may be stored in a storage unit other than the main memory 65.

[Internal Structure of Controller]

Figure 4:
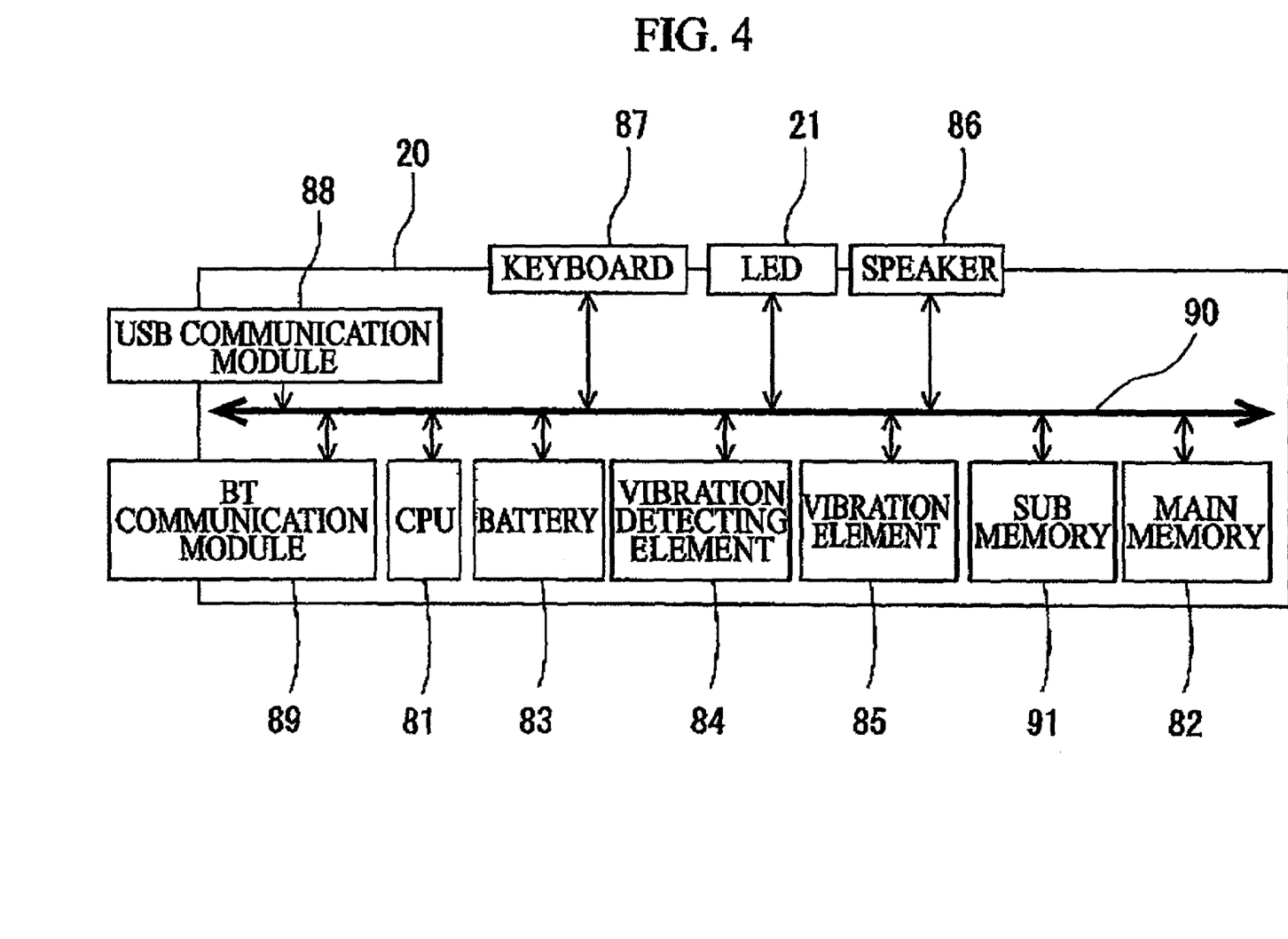
FIG. 4 is a block diagram showing an internal structure of the controller.

FIG. 4 shows a main internal structure of the controller 20.

In FIG. 4, the controller 20 has a CPU 81, nonvolatile main memory 82 constituted by DRAM, a battery 83, a vibration detector 84, a vibrating element 85, a speaker 86, a keyboard 87, the display unit (segment display or LED) 21, a USB communication module 88, a BT communication module 89, and nonvolatile sub-memory 91 constituted by flash memory or the like, which are connected via a bus 90. The keyboard 87 refers collectively to the above-mentioned various types of input buttons 33, 34, 35 to 38, 41 to 48, and 51 to 53 provided on the controller 20.

The CPU 81 reads in a start-up program from the sub-memory 91 when activating the controller 20 and then executes the start-up program. Furthermore, the CPU 81 performs display control for keeping the display unit 21 in a predetermined light emitting status, audio control for controlling audio output to the speaker 86, and vibration control for providing vibration to the controller 20 by driving the vibrating element 85.

Furthermore, the CPU 81 generates a physical layer connection request signal when the home button 52 or the start button 53 is pressed, and transmits the generated physical layer connection request signal to the console main unit 10 from the BT communication module 89. On the other hand, the CPU 81 generates a logical layer connection request signal when the BT communication module 89 has received the physical layer connection request signal, and transmits the generated Logical layer connection request signal to the console main unit 10 from the BT communication module 89. Note that generation and transmission of the logical layer connection request signal is repeatedly carried out at predetermined intervals until a logical layer connection enable signal is received from the console main unit 10.

The USB communication module 88 transmits and receives information to/from the console main unit 10 via the USB cable 13 through wired communication while the BT communication module 89 wirelessly transmits and receives information to/from the console main unit 10 through BT communication. The USB communication module 88 includes the connection port 15 (shown in FIG. 1) while the BT communication module 89 includes a wireless communication unit 17 (shown in FIG. 1). Only one communication path, namely either the connection port 15 of the USB communication module 88 or the wireless communication unit 17 of the BT communication module 89 may be selectively used, and is selected by the CPU 81 for use. Basically, the USB communication module 88 is selected and set as the communication path when the controller 20 and the console main unit 10 are connected by the USB cable 13.

However, the BT communication module 89 is selected and set as the communication path if the start button 53 is pushed even when the controller 20 and the console main unit 10 are connected by the USB cable 13. When the BT communication module 89 receives the logical layer connection enable signal from the console main unit 10, the CPU 81 switches the communication path from the BT communication module 89 to the USB communication module 88. The reason why the BT communication module 89 is set as the communication path even if the USB cable 13 is connected is described forthwith. When the start button 53 is pressed, it is very likely that the console main unit 10 is in the standby state, and the console main unit 10 in the standby state cannot transmit and receive information (data) through USB communication until the USB communication module 78 is started up and the USB driver is read-in and run by the main CPU 64. However, after the BT communication module 89 has received a logical layer connection enable signal from the console main unit 10, the USB communication module 78 is started up, and the USB driver is read-in and run by the main CPU 64, and thus USB communication is possible.

Furthermore, the sub-memory 91 is prestored with unique IDs as terminal identification information uniquely given to the respective controllers 20. The CPU 81 reads out a unique ID from the sub-memory 91 at a predetermined timing, and transmits the unique ID to the console main unit 10 from either the USB communication module 88 or the BT communication module 89. This unique ID is included in the aforementioned logical layer connection request signal.

Furthermore, the CPU 81 generates a preset command signal in conformity with an operation input to the keyboard 87 by the player, and transmits the generated command signal to the console main unit 10 from the USB communication module 88 or the BT communication module 89. More specifically, when the home button 52 and at least one of the other input buttons 33, 34, 35 to 38, 41 to 48, and 53 are depressed at the same time, the CPU 81 transmits to the console main unit 10 a specific processing conducting command signal in conformity with the button combination.

Note that USB cables 13A and 13B (shown in FIG. 1) connecting the controllers 20 to the console main unit 10 respectively include a power line, and with a USB connection, the console main unit 10 supplies power to the controllers 20 via the power line, thereby charging the battery 83.

Furthermore, the vibrating element 85 includes a fixed weight eccentric to the motor rotational axis, which rotates due to the motor running to make the controllers 20 vibrate. Running the motor in accordance with progression status of the game conveys a vibration to the player's hands at a predetermined timing. Moreover, the vibration detector 84 is a sensor for detecting vibration applied to the controllers 20 by the player, and is used for detecting a vibration from the player and then starting predetermined processing, such as turning on the controllers 20 in an off state.

[Description of BT Communication Software Stack]

Figure 5:
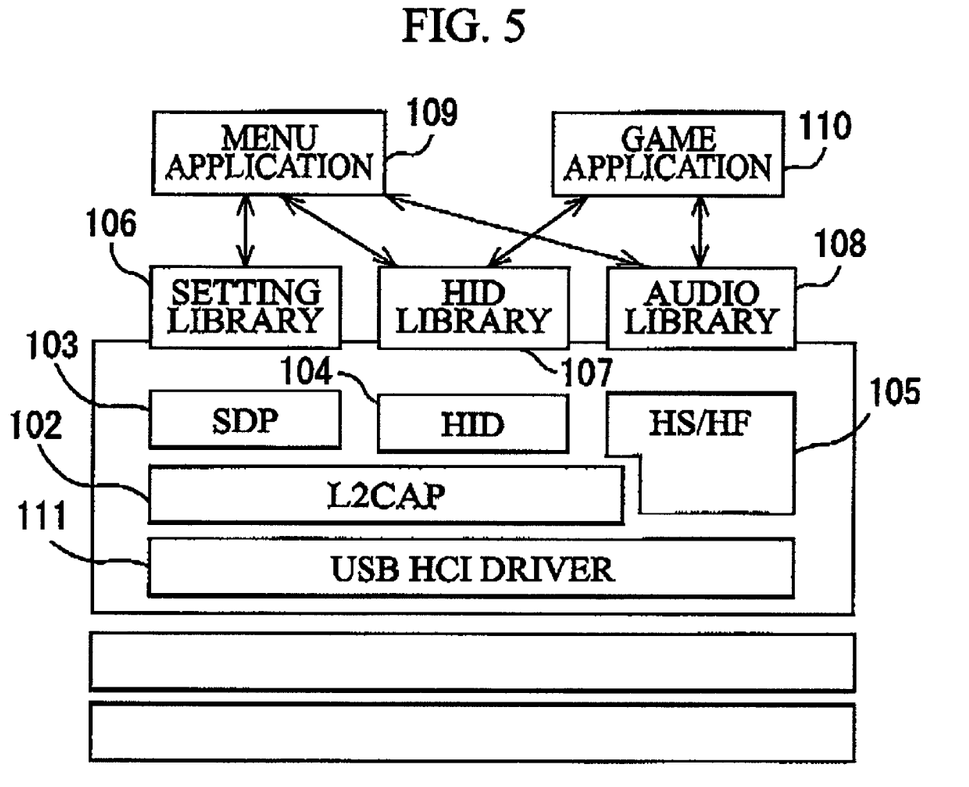
FIG. 5 is a diagram schematically showing a BT communication software stack.

As shown in FIG. 5, a BT communication software module stack or hierarchy includes a USB Host Controller Interface Driver (USB HCI Driver) 111, a Logical Link Control and Adaptation Protocol (L2CAP) 102, a Service Discovery Protocol (SDP) 103, a Human Interface Device (HID) 104, a Headset Profile/Hands-free Profile (HS/HF) 105, a Setting library 106, a Human Interface Device library (HID library) 107, and an Audio library 108. The lower layer USB HCI Driver 111 is a physical layer, and the upper layers L2CAP 102, SDP 103, HID 104, HS/HF 105, the Setting library 106, the HID library 107, and the Audio library 108 are logical layers.

The Setting library 106, the HID library 107, and the Audio library 108 in the upper most layer respectively perform execution control of a Menu Application 109 and a Game Application 110. The L2CAP 102 is a protocol controlling and managing the entire BT system. Note that although omitted from the drawing, the physical layer includes a link manager for establishing and managing a link, a Baseband, which is a digital engine for the BT system, and wireless protocols (Radio and Antenna).

With the physical layer connection, transmission and reception of information (data) between the controller 20 and the console main unit 10 through the physical layer is possible while with the logical layer connection, transmission and reception of information (data) between the controller 20 and the console main unit 10 through the physical layer and either of the logical layers is possible. Furthermore, the physical layer connection request signal transmitted from the controller 20 only includes the physical layer but does not include the logical layers, and the logical layer connection request signal includes at least the logical layer L2CAP 102, where the L2CAP 102 includes the controller ID.

[Description of Start Processing for Connection Between Controller and Console Main Unit in on State]

The console main unit 10 in an off state is turned on by supplying power. A controller 20 in an off state is turned on by depressing the on/off button 51.

Communication through a USB connection starts when the home button 52 of the controller 20 is depressed after both of the console main unit 10 and the controller 20 are in an on state and a USB connection is established therebetween. Once the USB connection starts, the console main unit 10 and the controller 20 conduct communication preparation for transmission and reception of information through the USB communication. Afterwards, the controller 20 reads out the unique ID stored in the sub-memory 91 and then transmits it to the console main unit 10. The main CPU 64 of the console main unit 10 registers the unique ID received from the controller 20 in the USB connection controller ID registration table. Note that the console main unit 10 determines whether there is a USB connection by detecting whether the USB cable 13 is properly connected.

BT communication starts when the home button 52 of the controller 20 is depressed in a state that both of the console main unit 10 and the controller 20 are in an on state and that neither of the console main unit 10 nor the controller 20 is in a USB connection. In this case, the controller 20 must be positioned within a communication range of the console main unit 10. When the home button 52 is pressed, the controller 20 transmits a physical layer connection request signal to the console main unit 10, which then receives the signal, conducts a physical layer connection process, and transmits a physical layer connection enable signal to the controller 20. The controller 20 that has received the physical layer connection enable signal transmits a logical layer connection request signal including the unique ID stored in the sub-memory 91 to the console main unit 10, which then receive the signal, conducts a logical layer connection process, and transmits a logical layer connection enable signal to the controller 20. In the logical layer connection process, the main CPU 64 registers the unique ID received from the controller 20 in the BT connection controller ID registration table. When the controller 20 receives the logical layer connection enable signal, start processing for BT communication is concluded.

In other words, when connection with the controller 20 is started, the main CPU 64 of the console main unit 10 determines whether it is either a USB connection or BT communication. In the case of a USB connection, communication preparation for transmission and reception of information through the USB connection is conducted, and the unique ID is then acquired from the controller 20 through the USB connection. On the other hand, in the case of BT communication, communication preparation for transmission and reception of information through the BT communication is conducted, and the unique ID is then acquired from the controller 20 through the BT communication.

Furthermore, when registering the unique ID for the controller 20 in the USB connection controller ID registration table, the main CPU 64 of the console main unit 10 determines whether the same unique ID is already registered in the BT connection controller ID registration table. If it is already registered, that unique ID is deleted from the BT connection controller ID registration table when registering it in the USB connection controller ID registration table. Similarly, when registering the unique ID for the controller 20 in the BT connection controller ID registration table, the main CPU 64 of the console main unit 10 determines whether the same unique ID is already registered in the USB connection controller ID registration table. If it is already registered, that unique ID is deleted from the USB connection controller ID registration table when registering it in the BT connection controller ID registration table.

[Description of Start-Up Process for Console Main Unit in Standby State through Remote-Control Operation by Controller]

This processing is started by pressing the start button 53 of the controller 20 when the console main unit 10 is in the standby state and the controller 20 is in the on state.

Figure 6:
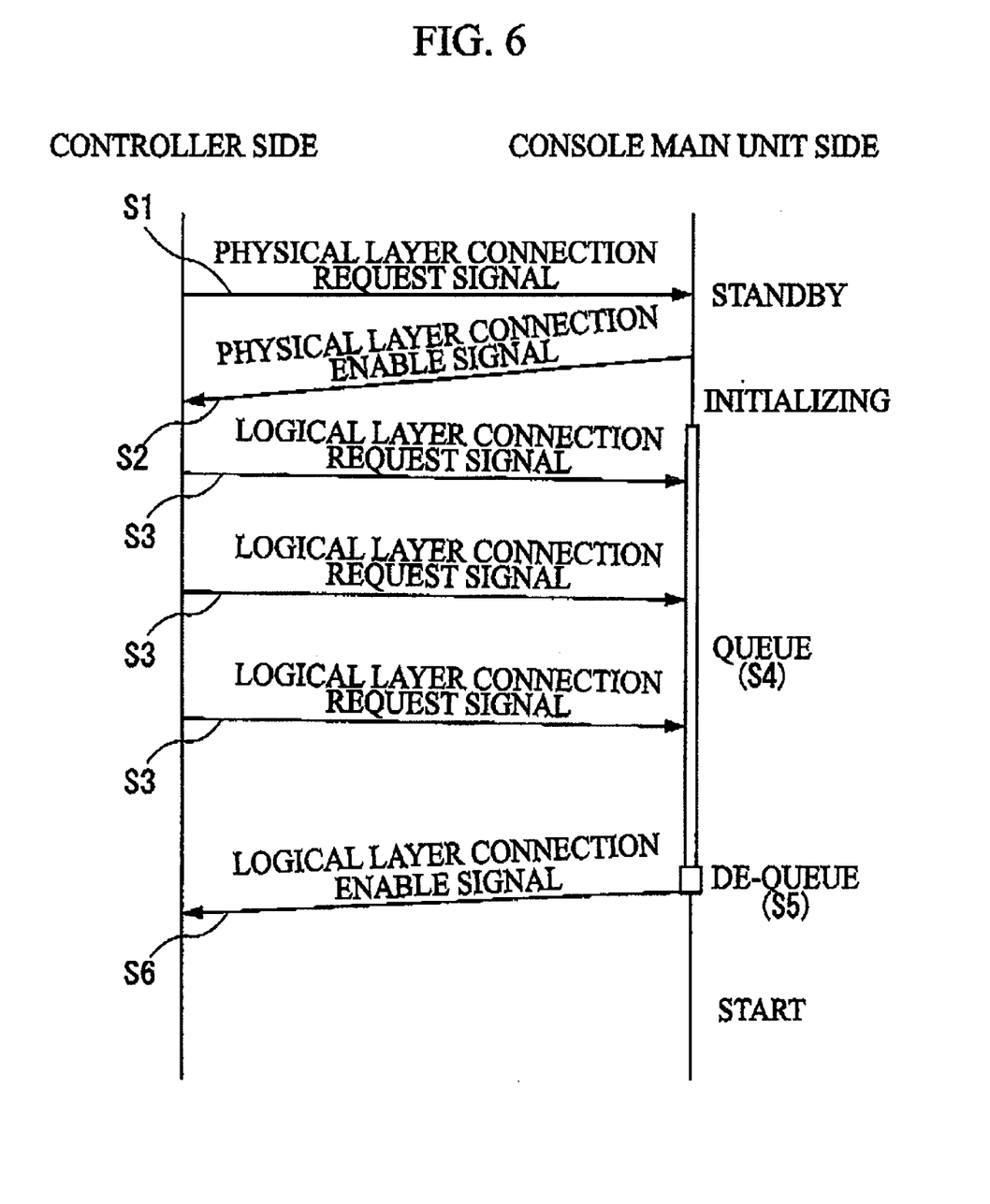
FIG. 6 is a time chart showing a start-up process for the console main unit in a standby states which runs in conformity with remote-control operation using a controller.

First, as shown in FIG. 6, the controller 20 transmits a physical layer connection request signal to the console main unit 10 through BT communication (step S1).

The BT communication module 79 for the console main unit 10 in the standby state receives the physical layer connection request signal, recognizes the physical layer for the physical layer connection request signal, conducts the physical layer connection process (initialization processing), and then transmits a physical layer connection enable signal to the controller 20 (step S2). As a result, the console main unit 10 enters a physical layer connection state, which allows inter-physical layer based transmission and reception of information to/from the controller 20 through BT communication.

In addition, the BT communication module 79 transmits the physical layer connection request signal directly to the system controller 73 upon reception thereof. The system controller 73 that has received the physical layer connection request signal from the BT communication module 79 recognizes the physical layer for the physical layer connection request signal, and starts the start-up process for the console main unit 10. In the start-up process, the main CPU 64 is started up later than the south bridge 54. Moreover, during the main CPU 64 start-up process, the BT driver and the USB driver are read-in and run, and then the controller connection managing program is read-in and run.

Once the controller 20 receives the physical layer connection enable signal from the console main unit 10, the console main unit 10 transmits a logical layer connection request signal (step S3). Transmission of the logical layer connection request signal is repeatedly carried out at predetermined intervals until the logical layer connection enable signal is received from the console main unit 10.

The main CPU 64 of the console main unit 10 for which the start-up process has started stores (queues) the physical layer connection request signal received by the BT communication module 79 in the main memory 65 once the BT driver is read-in and run) (step S4). This processing may be conducted even before the main CPU 64 completes reading in and running the controller connection managing program (even before the main CPU is completely running). In addition, once the controller connection managing program is completely read-in and run, the main CPU 64 reads out (de-queues) the logical layer connection request signal from the main memory 65, recognizes the logical layer (L2CAP102), and conducts the logical layer connection process (step S5). In the logical layer connection process, the main CPU 64 registers respective unique IDs for the controllers 20 included in the logical layer connection request signal in the BT connection controller ID registration table. When the logical layer connection process is finished, the console main unit 10 transmits a logical layer connection enable signal to the controllers 20 (step S6). Namely, the main CPU 64 begins the logical layer connection process without waiting for transmission of new logical layer connection request signals from the controllers 20 once the controller connection managing program is read-in and run. By the controllers 20 receiving the logical layer connection enable signal from the console main unit 10, the console main unit 10 enters a logical layer connection state allowing inter-logical layer based transmission and reception of information to/from the controllers 20 through BT communication and processing of the information. Note that the logical layer connection request signal received by the BT communication module 79 before the main CPU 64 reads in and runs the BT driver is nullified by the BT communication module 79. Furthermore, in the case where multiple logical layer connection request signals are received after the main CPU 64 reads in and runs the BT driver, all of the received logical layer connection request signals are queued and then de-queued. However, duplicate logical layer connection request signals de-queued the second or more time are nullified.

The aforementioned start-up process for the console main unit 10 is conducted through the aforementioned BT communication when the controllers 20 and the console main unit 10 are connected by the USB cable 13. The reason why the start-up process through BT communication is conducted in this manner is because the main CPU 64 in the standby state, the south bridge 54, and the USB communication module 78 have halted for saving power, and reception and processing of a start-up instruction signal from the controllers 20 through USB communication is impossible.

Figure 7:
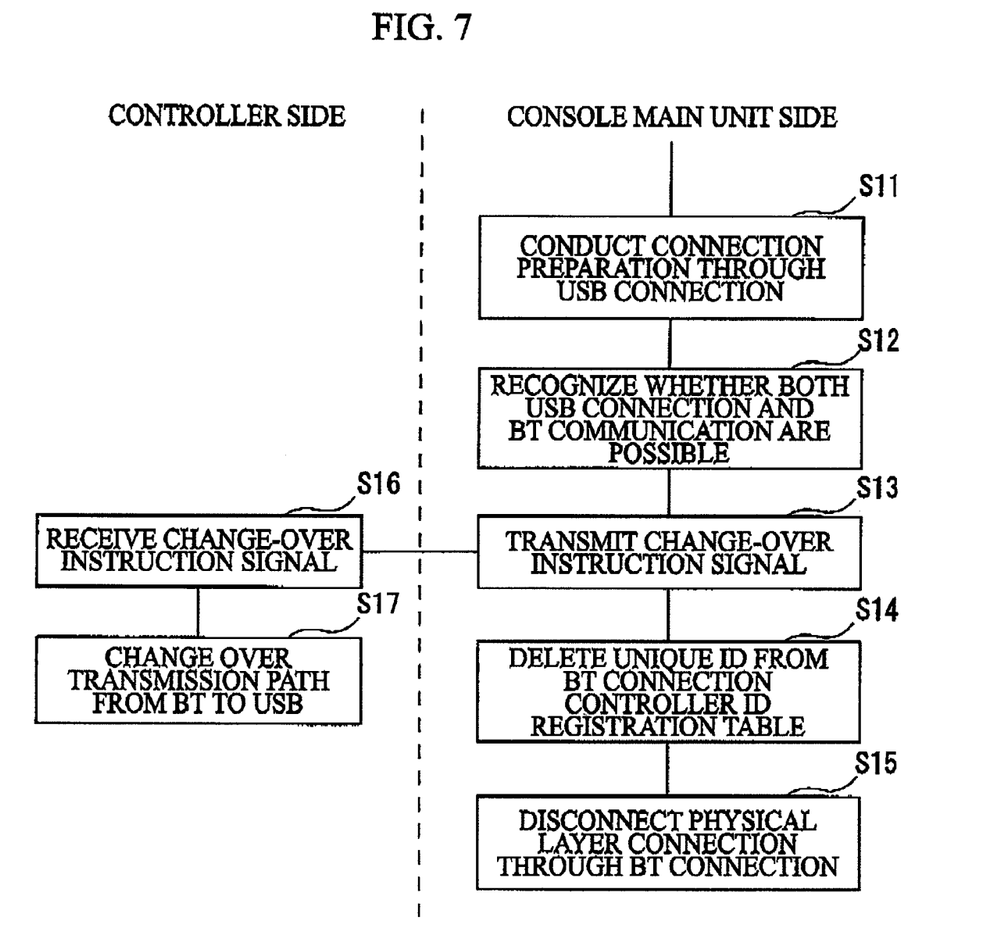
FIG. 7 is a time chart showing a change-over process from wireless connection to wired connection after the console main unit is started up.

Once the console main unit 10 is started up (after it has changed to the on state) after a logical layer connection through BT communication is established, a change-over process given below is conducted, changing over from BT communication to USB communication.

In the change-over process, as shown in FIG. 7, the main CPU 64 of the console main unit 10 conducts connection preparation (registering a unique ID for a controller 20 in the USB connection controller ID registration table) through USB communication (step S11). The main CPU 64 then recognizes that both BT communication and USB communication are possible for the same controller 20 (step S12). More specifically, it is determined whether the unique ID for the same controller 20 is registered in both the BT connection controller ID registration table and the USB connection controller ID registration table. A change-over instruction signal is then transmitted from the console main unit 10 to the controller 20 through USB communication (step S13). Next, the main CPU 64 deletes the unique ID for the controller 20 from the BT connection controller ID registration table (step S14). This disconnects the logical layer connection through BT communication. The BT communication module 79 for the console main unit 10 then disconnects the physical layer connection through BT communication (step S15).

When the controller receives the change-over instruction signal (step S16), the CPU 81 of the controller 20 changes over from the BT communication module 89 or a communication path, which is used for transmitting data of inputs from the keyboard 86, to the USB communication module 88 (step S17).

[Description of Disconnection Process for Controller and Console Main Unit]

A controller 20 capable of transmission and reception of information (data) to/from the console main unit 10 through USB communication or BT communication is reset through a disconnection process given below, into a state incapable of transmission and reception of information through USB communication or BT communication (default state).

The disconnection process is triggered by the player inputting a disconnection instruction to the controller 20. More specifically, the player performs a predetermined input to the controller 20 to display a menu screen on the monitor unit 100, and selects and determines 'Disconnect controller' in the menu. When the console main unit 10 receives a signal corresponding to this determination input from the controller 20, the main CPU 64 of the console main unit 10 starts the disconnection process.

When the disconnection process starts, the console main unit 10 transmits a disconnection instruction signal to the controller 20 through USB communication or BT communication.

The controller having received the disconnection instruction signal transmits a disconnection request signal to the console main unit 10 through USB communication or BT communication.

The main CPU 64 of the console main unit 10 having received the disconnection request signal cancels correspondence to the controller 20. More specifically, in the case of USB communication, the main CPU 64 deletes the unique ID for the controller 20 from the USB connection controller ID registration table. This disconnects (cancels) the logical layer connection through USB communication. On the other hand, in the case of BT communication, the main CPU 64 deletes the unique ID for the controller 20 from the BT connection controller ID registration table. This disconnects (cancels) the logical layer connection through BT communication. Furthermore, the BT communication module 79 disconnects (cancels) the physical layer connection.

As described above, according to this embodiment, the main CPU 64 of the console main unit 10 having received a start-up instruction to change from the standby state to the on state, which is issued from the controller 20 through BT communication in conformity with remote-control operation, reads out a logical layer connection request signal from the main memory 65 and starts logical layer connection processing without waiting for a transmission of a new logical layer connection request signal from the controller 20 once the controller connection managing program are read-in and run. Therefore, time until a logical layer connection, which allows the console main unit 10 to conduct a desired process through remote-control operation using a controller, is established may be reduced, which is convenient for the player.

Furthermore, in the standby state, other components excluding the system controller 73 and the BT communication module 79 may be halted, thereby controlling power consumption of the console main unit 10 in the standby state.

When starting up the console main unit 10 in the standby state to run through remote-control operation using the controller 20, processing through the aforementioned BT communication is conducted even if the console main unit 10 and the controller 20 are connected by the USB cable, starting up the console main unit 10. Thus the south bridge 54 and the USB communication module 78 in the standby state may be halted. As a result, power consumption of the console main unit 10 in the standby state may be controlled to a minimum.

Furthermore, a controller 20 capable of transmission and reception of information (data) to/from the console main unit 10 through USB communication or BT communication may be reset to a state incapable of transmission and reception of information through USB communication or BT communication (default state) through the disconnection process. As a result, for example, in the case where an environment allowing a single controller 20 to conduct BT communication with multiple console main units 10 at the same time is established, the player appropriately disconnects BT connections so that BT communications cannot be conducted with console main units 10 other than the manipulation subject.

Note that while the present invention is applied to the console main unit and the controllers thereof according to the descriptions of the embodiments given above, it is not limited thereto.

The descriptions of the respective embodiments given above are merely examples. Therefore, the present invention is not limited to the respective embodiments given above, and it is needless to say that various changes may be made without departing from the spirit or scope of the present invention.

What is claimed is:

1. An information communications system, comprising:
an operation terminal operated by a user; and
an information processing unit settable in a standby state,
wherein the operation terminal comprises a terminal side wireless transmitter, an input unit and a signal generator,
the terminal side wireless transmitter transmits and receives information to/from the information processing unit through wireless communication,
the input unit accepts a start-up instruction from the user for starting up the information processing unit in the standby state,
when the input unit received the start-up instruction the signal generator generates a physical layer connection request signal and makes the terminal side wireless transmitter transmits the physical layer connection request signal,
when the terminal side wireless transmitter received a physical layer connection enable signal from the information processing unit, the signal generator generates a logical layer connection request signal including terminal identification information uniquely set to the operation terminal and makes the terminal side wireless transmitter transmits the logical layer connection request signal repeatedly until the terminal side wireless transmitter receives a logical layer connection enable signal from the information processing unit, wherein
the information processing unit comprises a console side wireless transmitter, a start-up processing unit, a storage, a storage controller, a wireless logical layer connection processing unit and an information processing conducting unit,
the console side wireless transmitter conducts a physical layer connection process when the console side wireless transmitter received the physical layer connection request signal from the operation terminal,
the physical layer connection process includes establishing a physical layer connection with the operation terminal through wireless communication and transmitting the physical layer connection enable signal to the operation terminal,
the console side wireless transmitter transmits and receives information to/from the operation terminal through wireless communication in a state where the physical layer connection is established,
when the information processing unit is in the standby state and the console side wireless transmitter received the physical layer connection request signal from the operation terminal, the start-up processing unit starts a start-up process for the information processing unit,
the storage controller stores in the storage at least the terminal identification information included in the logical layer connection request signal when the console side wireless transmitter received the logical layer connection request signal from the operation terminal,
the wireless logical layer connection processing unit conducts a logical layer connection process,
the logical layer connection process includes reading out the terminal identification information from the storage, establishing a logical-layer connection with the operation terminal through wireless communication, generating the logical layer connection enable signal, and transmitting the logical layer connection enable signal from the console side wireless transmitter,
the information processing conducting unit conducts predetermined information processing according to information that the console side wireless 5 transmitter has received from the operation terminal in a state where the logical layer connection is established, and wherein
in the standby state, the storage controller, the wireless logical layer connection processing unit, and the information processing conducting unit of the information processing unit are halted, and the console side wireless transmitter and the start-up processing unit are started up, and
in the start-up process, the storage controller starts up earlier than the wireless logical layer connection processing unit.

2. The information communications system of claim 1, wherein
is the operation terminal comprises a terminal side wired transmitter which transmits and receives information to/from the information processing unit connected by wires through wired communication,
the information processing unit comprises a console side wired transmitter which transmits and receives information to/from the operation terminal connected by wires through wired communication,
the terminal side wireless transmitter transmits the physical layer connection request signal and the logical layer connection request signal even when the terminal side wired transmitter is connected to the information processing unit by wires, and the console side wireless transmitter transmits the physical layer connection enable signal and the logical layer connection enable signal even when the console side wired transmitter is connected to the operation terminal by wires.

3. The information communications system of claim 2, wherein when the terminal side wired transmitter is connected to the information processing unit by wires, the terminal side wired transmitter transmits and receives information to/from the information processing unit through wired communication after the terminal side wireless transmitter has received the logical layer connection enable signal, and when the console side wired transmitter is connected to the operation terminal by wires, the console side wired transmitter transmits and receives information to/from the operation terminal through wired communication after the console side wireless transmitter has transmitted the logical layer connection enable signal.

4. An information processing unit, which is capable of wireless communication with an operation terminal operated by a user, and settable while in a standby state; the information processing unit comprising:

a console side wireless transmitter;
a start-up processing unit;
a storage;
a storage controller;
a wireless logical layer connection processing unit; and
an information processing conducting unit, wherein the console side wireless transmitter conducts a physical layer connection process when the console side wireless transmitter received a physical layer connection request signal from the operation terminal, the physical layer connection process includes establishing a physical layer connection with the operation terminal through wireless communication and transmitting a physical layer connection enable signal to the operation terminal, the console side wireless transmitter transmits and receives information to/from the operation terminal through wireless communication in a state where the physical layer connection is established, when the information processing unit is in a standby state and the console side wireless transmitter received the physical layer connection request signal from the operation terminal, the start-up processing unit starts a start-up process for the information processing unit, the storage controller stores in the storage at least the terminal identification information included in the logical layer connection request signal when the console side wireless transmitter has received the logical layer connection request signal from the operation terminal, the wireless logical layer connection processing unit conducts a logical layer connection process, the logical layer connection process includes reading out the terminal identification information from the storage, establishing a logical layer connection with the operation terminal through wireless communication, generating a logical layer connection enable signal, and transmitting the logical layer connection enable signal from the console side wireless transmitter, the information processing conducting unit, which conducts predetermined information processing according to information that the console side wireless transmitter has received from the operation terminal in a state where the logical layer connection is established, and wherein in the standby state, the storage controller, the wireless logical layer connection processing unit, and the information processing conducting unit in the information processing unit are halted, and the console side wireless transmitter and the start-up processing unit are started up, and in the start-up process, the storage controller is started up earlier than the wireless logical layer connection processing unit.

5. The information processing unit of claim 4, further comprising:

a console side wired transmitter, which transmits and receives information to/from the operation terminal connected by wires through wired communication, wherein the console side wireless transmitter receives the physical layer connection request signal and the logical layer connection request signal and transmits the physical layer connection enable signal and the logical layer connection enable signal even when the console side wired transmitter is connected to the operation terminal by wires.

6. The information processing unit of claim 5, wherein when the console side wired transmitter is connected to the operation terminal by wires, the console side wired transmitter transmits and receives information to/from the operation terminal through wired communication after the console side wireless transmitter has transmitted the logical layer connection enable signal.

7. An information communication method for processing between an operation terminal operated by a user and an information processing unit settable in a standby state, wherein in the standby state, a storage controller, a wireless logical layer connection processing unit, and an information processing conducting unit in the information processing unit are halted, and a console side wireless transmitter and a start-up processing unit are started up; the information communication method comprising the steps of:

accepting a start-up instruction from the user for an input unit of the operation terminal to start up the information processing unit in the standby state;

generating, by a signal generator of the operation terminal, a physical layer connection request signal and transmitting the physical layer connection request signal from a terminal side wireless transmitter when the input unit received the start-up instruction;

conducting a physical layer connection process by the console side wireless transmitter of the information processing unit when the console side wireless transmitter received the physical layer connection request signal from the operation terminal, the physical layer connection process including establishing a physical layer connection with the operation terminal through wireless communication and transmitting a physical layer connection enable signal to the operation terminal;

starting a start-up process for the information processing unit by the start-up processing unit when the console side wireless transmitter received the physical layer connection request signal;

generating, by the signal generator of the operation terminal, a logical layer connection request signal and repeatedly transmitting the generated logical layer connection request signal from the terminal side wireless transmitter until the terminal side wireless transmitter receives a logical layer connection enable signal when the terminal side wireless transmitter received the physical layer connection enable signal;

storing, by the storage controller, the terminal identification information, which is included in at least the logical layer connection request signal, in a storage of the information processing unit when the console side wireless transmitter received the logical layer connection request signal from the operation terminal;

conducting a logical layer connection process by the wireless logical layer connection processing unit, the logical layer connection process including reading out the terminal identification information from the storage, establishing a logical layer connection with the operation terminal through wireless communication, generating the logical layer connection enable signal, and transmitting the logical layer connection enable signal from the console side wireless transmitter;

receiving, by the terminal side wireless transmitter, the logical connection enable signal from the information processing unit; and conducting, by the information processing conducting unit, predetermined information processing according to information that the console side wireless transmitter has received from the operation terminal in a state where the logical layer connection is established, wherein in the start-up process, the storage controller starts up earlier than the wireless logical layer connection processing unit.

* * * * *